(12) United States Patent
Gee et al.

(10) Patent No.: US 9,095,951 B2
(45) Date of Patent: Aug. 4, 2015

(54) COMMON GROUND FOR ELECTRONIC LAPPING GUIDES

(71) Applicant: HGST Netherlands B.V., Amsterdam (NL)

(72) Inventors: Glen P. Gee, San Jose, CA (US);
Edward H. P. Lee, San Jose, CA (US);
David J. Seagle, Morgan Hill, CA (US);
Darrick T. Smith, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 189 days.

(21) Appl. No.: 13/690,657

(22) Filed: Nov. 30, 2012

(65) Prior Publication Data

US 2014/0154951 A1 Jun. 5, 2014

(51) Int. Cl.
| | |
|---|---|
| *B24B 49/10* | (2006.01) |
| *B24B 37/005* | (2012.01) |
| *B24B 37/00* | (2012.01) |
| *G11B 5/187* | (2006.01) |
| *G11B 5/31* | (2006.01) |

(52) U.S. Cl.
CPC ............. *B24B 37/00* (2013.01); *B24B 37/005* (2013.01); *G11B 5/1871* (2013.01); *G11B 5/3166* (2013.01); *G11B 5/3169* (2013.01); *Y10T 29/49004* (2015.01); *Y10T 29/49032* (2015.01)

(58) Field of Classification Search
CPC .... B24B 37/005; B24B 37/00; G11B 5/1272; G11B 5/1871; G11B 5/3169; G11B 5/3166
USPC ........ 451/5, 8, 9, 10, 28, 1; 29/603.09, 603.1, 29/603.12, 603.16
See application file for complete search history.

(56) References Cited

U.S. PATENT DOCUMENTS

| | | | |
|---|---|---|---|
| 5,065,483 A | 11/1991 | Zammit | |
| 5,210,667 A | 5/1993 | Zammit | |
| 5,816,890 A * | 10/1998 | Hao et al. | ........................ 451/5 |
| 6,758,722 B2 | 7/2004 | Zhu | |
| 7,551,406 B1 * | 6/2009 | Thomas et al. | ............... 360/317 |
| 8,165,709 B1 * | 4/2012 | Rudy | ........................... 700/121 |

(Continued)

OTHER PUBLICATIONS

Jiang, M. et al., On the advanced lapping process in the precision finishing of thin-film magnetic recording heads for rigid disc drives, Applied Physics A, Dec. 2003, pp. 923-932, vol. 77, Issue 7, Springer-Verlag, New York, United States.

(Continued)

*Primary Examiner* — Robert Rose
(74) *Attorney, Agent, or Firm* — Patterson & Sheridan, LLP

(57) ABSTRACT

Embodiments described herein generally relate to connecting Electronic Lapping Guides (ELG) to a lapping controller such that the number of wire bonds from the controller to a row of read heads is minimized. When lapping the air bearing surface of the read heads, the electrical resistances of the ELGs are monitored to adjust the lapping process and set the stripe height for read sensors in the read heads. Once the resistance corresponds to the desired stripe height, the lapping process is stopped. To measure the resistance, each ELG may be electrically coupled to the same substrate—i.e., share the same common ground. The lapping controller applies a voltage potential across the ELGs using a wire bonded to a pad in the respective read head and one or more connections to the grounded substrate. This configuration avoids having to bond two wires onto each read head.

20 Claims, 8 Drawing Sheets

(56) References Cited

U.S. PATENT DOCUMENTS

2005/0070206 A1 3/2005 Kasiraj et al.
2011/0027618 A1 2/2011 Lee et al.

OTHER PUBLICATIONS

Gatzen, Hans H. et al, Precision Machining of Rigid Disk Head Sliders, IEEE Transactions on Magnetics, May 1996, pp. 1843-1849, vol. 32, No. 3, IEEE, Piscataway, United States.

* cited by examiner

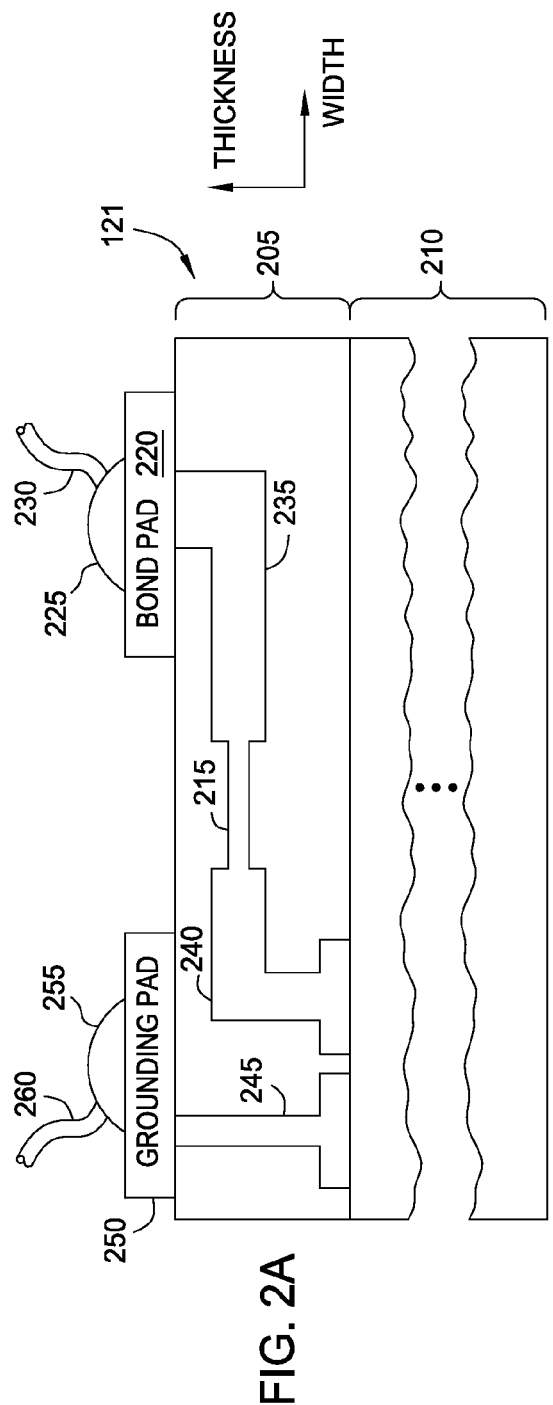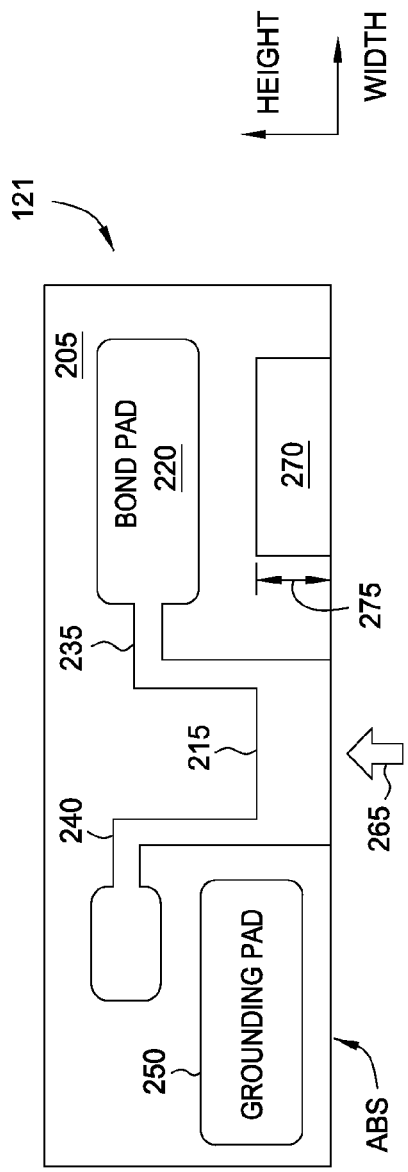
FIG. 2A
FIG. 2B

COMMON GROUND FOR ELECTRONIC LAPPING GUIDES

BACKGROUND OF THE INVENTION

1. Field of the Invention

Embodiments of the present invention generally relate to a using electronic lapping guides to set a read sensor's stripe height, or more specifically, to minimizing electrical connections to a read head when monitoring the electronic lapping guides.

2. Description of the Related Art

A typical magnetoresistive (MR) read head includes an MR read sensor, which is located between first and second shield layers. When the read sensor is subjected to positive and negative signal fields from tracks on a rotating magnetic disk in a disk drive, the resistance of the read sensor changes. These resistance changes cause potential changes in a sense current flowing through the read sensor, which are processed as playback signals by processing circuitry.

The read sensor has an exterior surface that faces the rotating magnetic disk and is supported on an air bearing from the rotating disk. This exterior surface is referred to as an air bearing surface (ABS). The read sensor has a back edge that is recessed in the read head opposite the air bearing surface. During fabrication, the ABS is defined so that the read sensor has a precise stripe height—i.e., the distance between the ABS and the back edge. This is accomplished by lapping (grinding) a wafer on which the MR head is constructed until the desired stripe height is achieved.

One technique for determining whether the read sensor has the desired stripe height involves transmitting a current through the read sensor and measuring the change in resistance as the ABS is lapped. However, the materials of the read sensor may introduce noise into the current that makes this technique unreliable. Instead, an electrical element called an electronic lapping guide (ELG) may be fabricated on the read head proximate to the read sensor. Moreover, the ELG may be made of similar materials and have similar dimensions as the read sensor. For example, the ELG may be formed in the same photo and subtractive processes as the read sensor to make the elements co-planar. Thus, as the ABS is lapped, the dimensions of the ELG and the read sensor are affected in a similar manner. Moreover, the materials of the ELG may be selected such that a current flowing through the ELG reliably indicates the changing resistance as the lapping process grinds the ABS—i.e., the ELG, when lapped, generates a signal with less noise relative to the read sensor. The resistance of the ELG may be correlated with a particular stripe height. Once the resistance that correlates to the desired stripe height is achieved, the lapping is stopped. Because of the shared physical dimensions of the ELG and the read sensor, a read sensor proximate to the ELG is assumed to have the same stripe height as the ELG.

SUMMARY OF THE INVENTION

One embodiment herein discloses a device including a substrate and a plurality of read heads disposed on the substrate. A first one of the plurality of read heads includes a read sensor configured to detect magnetic orientation changes in a magnetic media and an electronic lapping guide (ELG) configured to indicate, based on a resistance of the ELG, a stripe height of the read sensor. Furthermore, the ELG is electrically coupled to the substrate. The first read head also includes a first bonding pad electrically coupled to the ELG, where the first bonding pad, the ELG, and the substrate are part of a current path permitting current to flow through the ELG.

Another embodiment herein discloses a system including a substrate comprising a plurality of read heads, where each read head includes a read sensor configured to sense data stored in a magnetic media and an ELG configured to indicate, based on a resistance of the ELG, a stripe height of the read sensor. Furthermore, the ELG is electrically coupled to the substrate. Each read head also includes a bonding pad electrically coupled to the ELG, where the bonding pad, the ELG, and the substrate are part of a current path permitting current to flow through the ELG. The system further includes a lapping unit configured to simultaneously lap an air bearing surface on the plurality of read heads, where the substrate is mounted on the lapping unit, and a lapping controller electrically coupled to the bonding pad and the substrate. The lapping controller configured to measure the resistance of the ELG using the current path and transmit instructions to the lapping unit based on the measured resistance.

Another embodiment herein discloses a method including attaching a first wire to a bonding pad on a first one of a plurality of read heads disposed on a substrate, the first read head including a read sensor configured to detect magnetic orientation changes in a magnetic media and an ELG configured to indicate, based on a resistance of the ELG, a stripe height of the read sensor. Furthermore, the ELG is electrically coupled to the substrate, and the bonding pad is electrically coupled to the ELG. The method includes attaching a second wire to a substrate access pad electrically coupled to the substrate and applying a voltage potential across the first and second wires such that current flows through the substrate and the ELG.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-2B illustrate a portion of a read head with an ELG for setting a stripe height, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
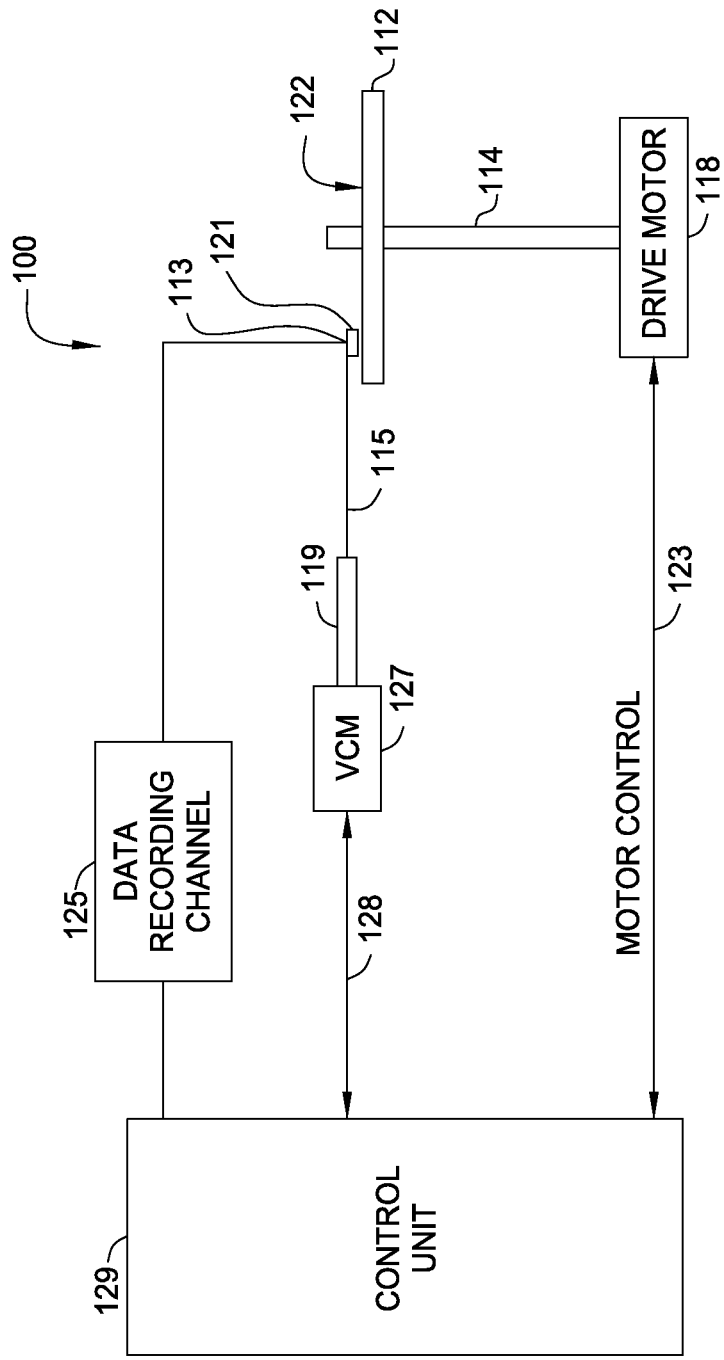
FIG. 1 illustrates a disk drive system, according to embodiments described herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments described herein generally relate to connecting an ELG to a lapping controller such that the number of wire bonds from the controller to the read head is minimized. When lapping the ABS of a read head (or a plurality of read heads), the electrical resistance of the ELG is used to adjust the lapping process and set the stripe height for a read sensor in the read head. Specifically, as an exterior surface of the ELG at the ABS is lapped, the resistance of the ELG increases. Once the resistance corresponds to the desired stripe height—i.e., the distance between the ABS and the back edge of the read sensor—the lapping process is stopped. To measure the electrical resistance of the ELG, a lapping controller is wire bonded to at least one pad on the read head that electrically connects the controller to the ELG. In addition to being connected to the pad, the ELG is electrically connected to an electrically conductive substrate on which the read head is disposed. The substrate may be used as a common ground for the current that flows through the bond pad and the ELG.

Because many read head fabrication techniques lap a plurality of read heads simultaneously, each ELG in the read heads may be electrically coupled to the substrate—i.e., share the same ground plane. The lapping controller is then wire bonded to the individual ELGs via respective pads, but the controller is connected to the substrate only at a few locations. For example, the lapping controller may be wire bonded to thirty ELGs in a row of read heads but only have one or two electrical connections to the conductive substrate. The resistances of each of the connected ELGs can be monitored by sweeping through the different wire bond connections. In contrast, if a shared common ground is not used (i.e., current does not flow through the substrate) the lapping controller couples to two pads per read head in order to measure the resistance of the ELG. When using a shared ground connection to the substrate, however, the lapping controller may be connected to only one bond pad for each ELG of interest. Minimizing the number of wire bonds by using a common ground (e.g., the conductive substrate) may provide cost savings compared to wire bonding the lapping controller to two bonding pads per read head.

An Exemplary Hard Drive

FIG. 1 illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Attaching an ELG to a Shared Ground Connection

FIGS. 2A-2B illustrate a portion of a read head with an ELG for setting a stripe height, according to embodiments described herein. FIG. 2A illustrates a portion of the magnetic head assembly 121 where the assembly 121 includes a portion of the read head 205 and a conductive substrate 210. The read head 205 includes a plurality of different layers that may be used to form, for example, a plurality of shield layers and a read sensor (not shown). The read sensor may be a magnetoresistive sensor such as giant magnetoresistance (GMR) sensor or a tunneling magnetoresistance sensor (TMR) where the electrical resistance of the read sensor is measured to identify a change in magnetic orientation of the magnetic material in the associated disk. In one embodiment, the read sensor is a current-perpendicular-to-the-plane (CPP) GMR sensor or a TMR sensor formed by lapping an ABS.

FIG. 2A illustrates a side view of the magnetic assembly 121 where other elements of the read head 205 are omitted. Specifically, FIG. 2A illustrates only the components used in the assembly 121 to connect an ELG 215 to an electrical circuit. A lapping controller (not shown) is electrically coupled to the ELG 215 by connecting a conductive wire (e.g., gold or copper wire, or other highly conductive material) to a bonding pad 220. The connective material 225 (e.g., a melted portion of a bond wire, a solder bump, conductive paste/epoxy, ultrasonic bonding, and the like) may be used to physically and electrically couple the wire 230 to the pad 220. A first internal lead 235 connects the bonding pad 220 to a first side of the ELG 215 thereby electrically connecting the ELG to an external lapping controller. A second internal lead 240 connects a different side of the ELG 215 to the conductive substrate 210 (e.g., titanium carbide/alumina, or other suitable conductive material). The read head 205 may include a third internal lead 245 that connects the substrate 210 to the grounding pad 250. In one embodiment, the second internal lead 240 and third internal lead 245 may be combined into the same lead. Like the bonding pad 220, the grounding pad 250 may also be connected to the lapping controller using connective material 255 and a conductive wire 260. In this manner, the lapping controller may use a voltage source to provide a potential difference between the grounding pad 250 and the bonding pad 220 which generates a current through the ELG 215. Alternatively, the lapping controller may source a current between the pads 250 and 220 and measure the resulting potential difference.

FIG. 2B illustrates a top view of the read head 205. The arrow 265 illustrates a direction where the ELG 215 is polished during the lapping process. That is, arrow 265 illustrates an exterior surface of the ELG 215 that is formed into an ABS by the lapping process. During this process, the surface of the ELG 215 on the ABS is lapped or polished by an abrasive surface which decreases the one or more physical dimensions of the ELG 215. As a physical dimension of the ELG 215 (e.g., its height) is decreased by the lapping process, the current flowing through the ELG 215, and thus, the resistance of the ELG 215 is changed. Decreasing the size of the ELG 215 reduces the amount of area in which the current can flow, thereby increasing the electrical resistance. The lapping controller measures the resistance based on the current flowing through the ELG 215 and determines a corresponding stripe height 275 based on the resistance. For example, assume that the ELG 215 is 6 microns wide, 10 nm thick, and 100 nm tall. These dimensions may correspond to a measured resistance of 250 ohms ($\Omega$). However, after performing the lapping process, the ELG 215 is 6 microns wide, 10 nm thick, and only 50 nm tall which may correspond to a resistance of 500$\Omega$. The lapping controller may be preconfigured to contain a data structure that correlates a measured resistance to the physical dimensions of the ELG 215. Although the embodiments presented herein discuss lapping as the chosen method for forming the ABS and setting the stripe height, other planarization techniques may be used to set the stripe height.

FIG. 2B also illustrates a read sensor 270 in the read head 205 which is not shown in FIG. 2A. The read sensor 270, like the ELG 215, also includes an exterior surface on the ABS which is polished by the lapping process as shown by arrow 265 and may have the same physical dimension as the ELG and related locations in the read head 205 such as being co-planar. The ELG 215 may include a plurality of materials that are similar to the materials in a read sensor in the read head 205. However, the ELG may be fabricated differently from the read sensor such that the ELG 215 generates a signal during lapping that can be used by the lapping controller to identify the resistance of the ELG 215. In contrast, if the lapping controller were connected to the read sensor 270 during the lapping process, the electrical properties of the materials in the read sensor 270 (or the arrangement of those materials) prevent the lapping controller from accurately identifying the resistance of the read sensor 270. Specifically, in some embodiments, the structure of the read sensor 270 is prone to smearing shunts during lapping, and thus, is unsuitable for controlling the lapping process. By fabricating the ELG 215 to include the similar materials as well as similar physical dimensions as the read sensor 270, both the ELG 215 and the read sensor 270 are similarly changed during the lapping process. Thus, the ELG 215 may serve as a proxy to the read sensor 270 where the height or the resistance of the ELG 215 is imputed to the read sensor 270. That is, either the height or the resistance of the ELG 215 may be used to derive the current stripe height 275 of the read sensor 270.

In other embodiments, the grounding pad 250 may not be connected to the lapping controller. For example, the lapping controller may instead connect to the substrate 210 at a portion of the top surface of the substrate 210 that is not covered by the read head 205. This may enable an electrical connection from the lapping controller and the substrate 210 with less electrical resistance because the third internal lead 245 and the grounding pad 250 may be omitted or substituted by electrical elements with smaller resistances.

The embodiments disclosed herein, however, are not limited to any particular type or method of fabricating the ELG 215. Indeed, the present embodiments may use any ELG 215 so long as the ELG 215 can be used to derive the stripe height 275.

Figure 3A:
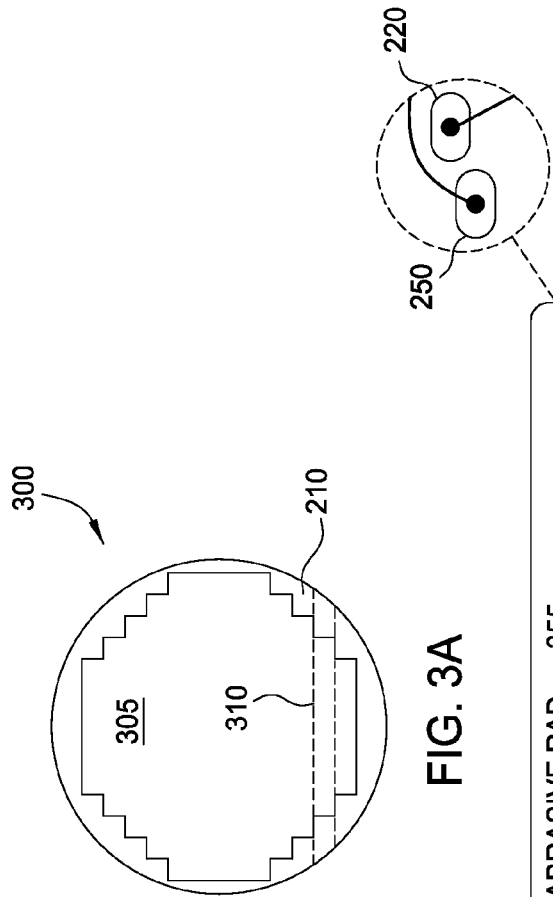
FIG. 3A illustrates a wafer with a plurality of read heads, according to one embodiment described herein.

FIG. 3A illustrates a wafer 300 with a plurality of read heads, according to one embodiment described herein. The wafer 300 includes a substrate 210 that is processed to include a plurality of read heads 305. That is, a single wafer 300 may include hundreds of different read heads 305 with individual ELGs and read sensors. Before lapping the read heads 305 to set the stripe height of the read sensors, the wafer 300 may be cleaved or diced (using a saw) into individual rows. The ghosted portion 310 illustrates a particular row of the read heads 305 that may be separated from the rest of the read heads 305.

Figure 3B:
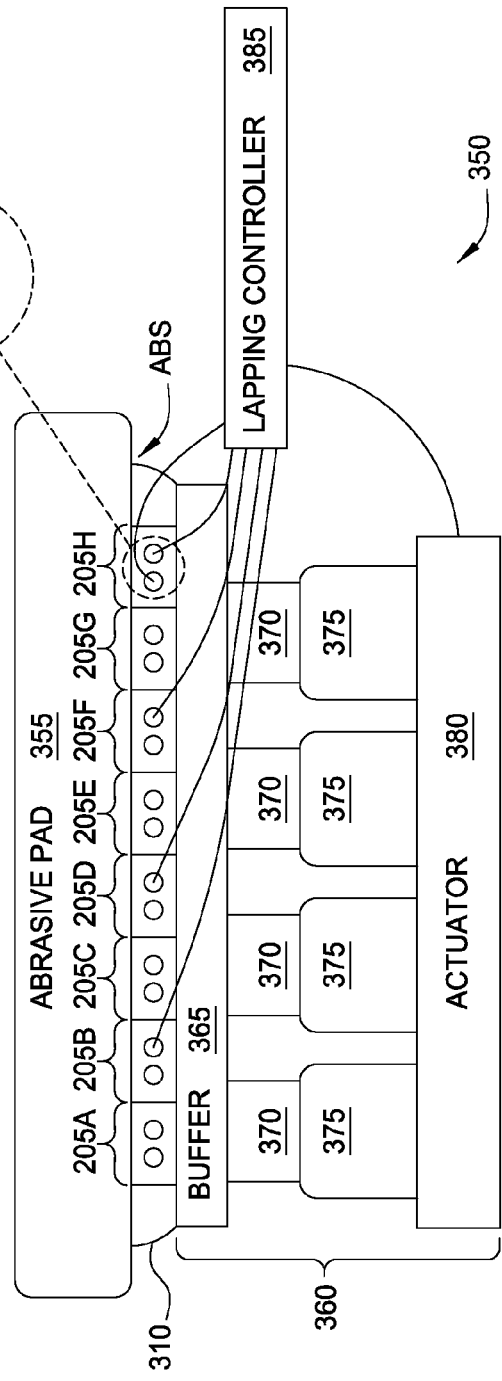
FIG. 3B illustrates lapping a row of read heads based on a measured resistance of one or more ELGs, according to one embodiment described herein.

FIG. 3B illustrates lapping a row of read heads 310 based on a measured resistance of one or more ELGs, according to one embodiment described herein. The row 310 diced from the wafer 300 shown in FIG. 3A is mounted into the lapping system or unit 350. As shown, the row includes a plurality of read heads 205A-205H. Only eight reads are shown, but the number of read heads per each row may vary depending on the particular portion of the wafer the row was diced from. Accordingly, each row 310 may include only one read head or even a hundred read heads. Each read head 205A-205H includes two external bonding pads: a grounding pad 250 and a bonding pad 220. Although each read head 205A-205H includes both types of pads, in other embodiments only certain read heads may have grounding pads 250 (e.g., only the read heads 205A and 205H at the end of the row 310). Additionally or alternatively, only a subset of the read heads 205A-205H in a row 310 may have bonding pads 250. Regardless how the pads 220, 250 are distributed amongst the different read heads 250A-205H, the bonding pads 220 connect to one side of an ELG in the sensor heads 250A-205H while the grounding pads 250 provide a connection to the substrate 210 of the row 310.

The lapping system 350 also includes an abrasive pad 355, force system 360, and a lapping controller 385. The abrasive pad 355 may include one or more separate pads that rub against the ABS of the read heads 205A-205H, thereby removing portions of the ABS and reducing the height of the read sensors as shown in FIG. 2B. The abrasive pad 355 may be an abrasive material such as diamond particles, aluminum oxide, or silicon carbide that grinds or laps away the portion of the read heads 205A-205H that the pad 355 contacts. Alternatively, the abrasive pad 355 may be a softer material such as tin that is "charged" with an abrasive to lap the ABS.

The force system 360 includes an actuator 380, pistons 375, rods 370, and a buffer 365. The actuator 380 is communicatively coupled to the lapping controller 385 and receives instructions for separately controlling the respective pistons 375. Stated differently, the actuator 380 uses the pistons 375 to determine how much force to apply to different portions of the row 310. The pistons 375 may be electrically, magnetically, pneumatically, or hydraulically controlled to apply a specified pressure or force to the buffer 365. The buffer 365—a semi-flexible material such as polyurethane—transfers the force to a respective portion of the row 310. By increasing the force applied by a particular piston 375, the actuator 380 controls the rate at which the abrasive pad 355 grinds a read head or group of read heads 205. Here, each piston 375 is associated with two read heads 205A-205H although each piston 375 may be assigned to more or less than this number. If the actuator 380 is informed by the lapping controller 385 that some subset of the read heads 205A-205H are being lapped at a different rate by the abrasive pad 355 relative to another portion, then the actuator 380 can adjust the associated pistons 375 to correct the imbalance.

The lapping controller 385 (e.g., a printed circuit board or other logic containing computing element) may be used to determine the lap rate of the different read heads 205A-205H and instruct the actuator 380 to correct any imbalance or stop the lapping process when the desired stripe height is achieved. As shown, the lapping controller 385 is electrically coupled (e.g., wire bonded) to every other read head in the row 310, i.e., read heads 205B, 205D, 205F, and 205H, using the bonding pads 220. However, the lapping controller 385 may be coupled to more or less than this ratio. In one embodiment, the lapping controller 385 is coupled to as many read heads as there are pistons 375 in the actuator 380. That is, the lapping system 350 may designate one of the read heads associated with a piston 375 as the representative head (e.g., read heads 205B, 205D, 205F, or 205H) which is coupled to the lapping controller 385. The resistance of ELG in the representative read head is then measured and used by the lapping controller 385 to control the associated piston 375. However, to improve control, in other embodiments the lapping controller 385 may be coupled to two or more of the read heads 205 associated with a single piston 375 and control the piston 375 based on measuring the resistance of both of the ELGs in the two or more heads. For example, the lapping controller 385 may average the measured resistances of the ELGs and use the average resistance to derive the stripe height and control the piston pressure.

Instead of connecting to a plurality of grounding pads 250, the lapping controller 385 may couple only to a select number of pads 250. Stated differently, the lapping controller 385 couples to less grounding pads 250 than to bonding pads 220. This embodiment is contrasted to an embodiment where, in order to measure the resistance of the ELG, lapping controller 385 is coupled to at least two pads on the read head. For example, referring to FIG. 2A, instead of the second internal lead 240 connecting to the conductive substrate 210, the lead 240 may directly connect to the grounding pad 250. Thus, to measure the resistance of each ELG 215 in a row of read heads, the lapping controller must have two connections to each read head 205: one connection to the bonding pad 220 and one connection to the grounding pad 250. By connecting each ELG 215 in a plurality of read heads 205 to the substrate 210 as shown in FIG. 2A, the lapping controller 385 in FIG. 3B no longer needs two connections to each read head 205. Instead, the lapping controller 385 uses only one connection to bonding pad 220 on a read head 205 to access the ELG and a second connection to a shared ground plane—i.e., the conductive substrate 210. As shown in FIG. 3B, the lapping controller 385 is connected to the bonding pad 220 of read heads 205B, 205D, 205F, and 205H but has only one connection to the substrate 210 via the grounding pad of read head 205H.

When lapping, the lapping controller 385 may iteratively apply a voltage or source a current to each connected read head 205B, 205D, 205F, and 205H using the respective bonding pads 220 and the grounding pad 250 of read head 205H. Because the connected read heads 205B, 205D, 205F, and 205H share the same ground connection, the lapping controller 385 may measure the resistances of the ELGs in each of the read heads 205B, 205D, 205F, and 205H sequentially during non-overlapping intervals. Based on the measured resistances, the lapping controller 385 sends adjustment instructions to the actuator 380 for changing the pressure applied by the pistons 375. For example, if the resistance associated with read head 205H is greater than the resistances of the other read heads coupled to the lapping controllers 385, the actuator 380 may reduce the pressure applied by the actuator 380 associated with read head 205H (or increase the pressure applied by the pistons 375 associated with the other read heads 205B, 205D, and 205F).

Figure 4A:
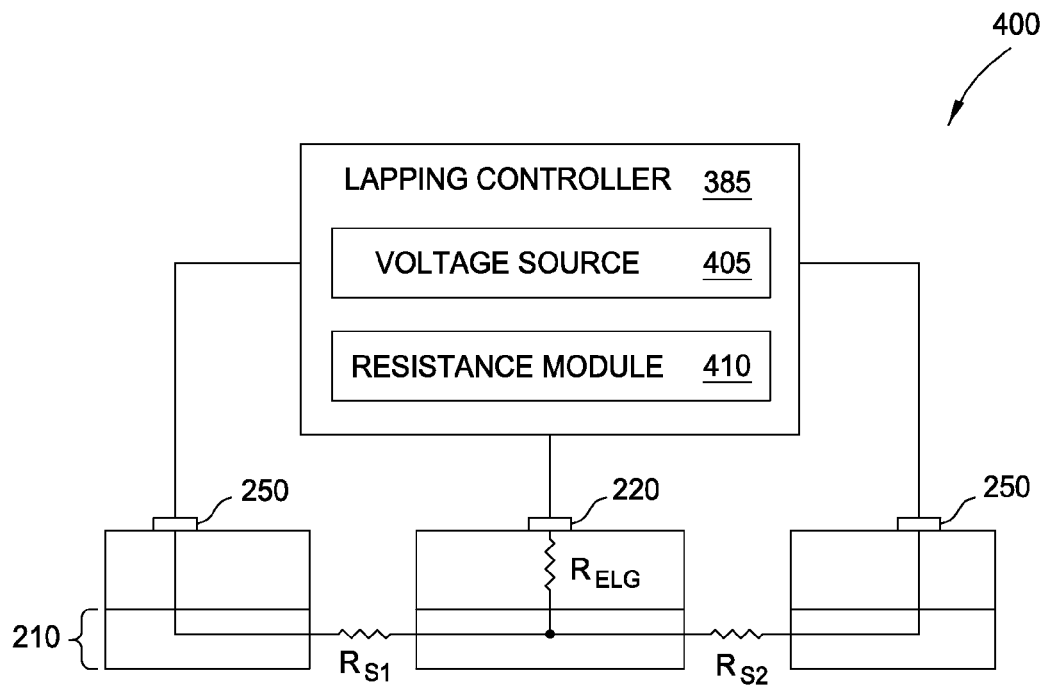
FIGS. 4A-4B illustrate circuit model diagrams of an electrical circuit that includes the substrate on which the read head is disposed, according to embodiments described herein.
Figure 4B:
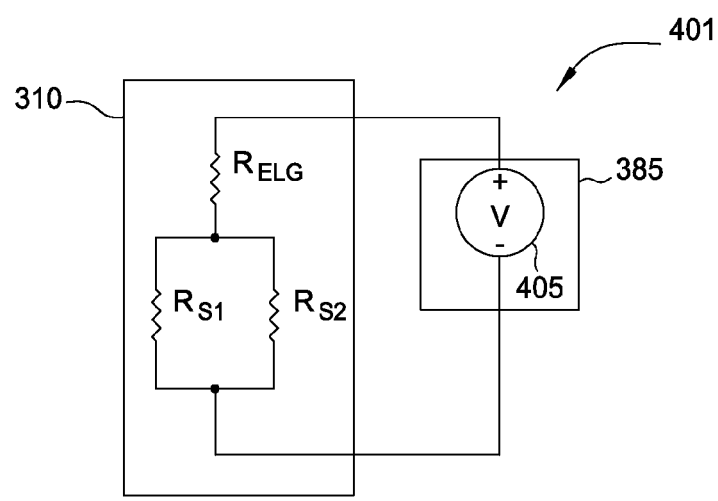

FIGS. 4A-4B illustrate circuit model diagrams of an electrical circuit that includes the substrate on which the read head is disposed, according to embodiments described herein. Specifically, FIG. 4A illustrates a circuit model 400 for a row of read heads, however, for clarity, the connections between other read heads in the row and the lapping controller 385 have been omitted. The circuit model 400 includes two ground connections for connecting the lapping controller 385 to the substrate 210 via two different grounding pads 250. The lapping controller 385 includes a voltage source 405 which provides a voltage potential between the grounding pads 250 and the bonding pad 220. The voltage potential results in current flowing between the pads 220, 250 and through the ELG which is here modeled as a resistive element $R_{ELG}$. Moreover, the resistance of the conductive substrate 210 may be modeled as two resistive elements $R_{S1}$ and $R_{S2}$. Specifically, $R_{S1}$ and $R_{S2}$ represent the resistance of the substrate 210 where current flows between the ELG and the respective grounding pads 250. The values of $R_{S1}$ and $R_{S2}$ vary based on the distance which this current travels between the ELG (i.e., $R_{ELG}$) and the grounding pads 250. If, for example, the lapping controller 385 is currently testing a read head that is closer to the leftmost grounding pad 250 and the substrate 210 is substantially uniform, than $R_{S1}$ has a smaller resistance value than $R_{S2}$. Thus, each time the lapping controller 385 tests a different ELG using the same grounding pads 250, the values of $R_{S1}$ and $R_{S2}$ may vary. Although not shown, in another embodiment, the lapping controller 385 may include a current source that injects a known current between the bonding pad 220 and the grounding pads 250.

The voltage source 405 may transmit DC signals, AC signals, or some combination of both. When transmitting an AC signal, the voltage source 405 may use any type of waveform such as square, sinusoidal, sawtooth, and the like. The resistance module 410 may be coupled to the voltage source 405 such that the module 410 is informed of the voltage being applied in the circuit 400. Based on a measured current or a measured voltage if a current source is used, the resistance module 410 then derives the value of $R_{ELG}$. Different methods of deriving $R_{ELG}$ from the total resistance of the circuit 400 (i.e., the combination of $R_{ELG}$, $R_{S1}$, and $R_{S2}$) will be discussed below. Other resistances in the circuit 400 may be small enough that they can be ignored, such as bump resistances at the pads 220 and 250, or be included in the values of $R_{S1}$ and $R_{S2}$.

FIG. 4B illustrates a simplified circuit model 401 where the voltage source 405 is coupled to a particular read head in the row 310. A positive side of the voltage source 405 is shown connected to $R_{ELG}$ while a negative side of the voltage source 405 is coupled to a common ground node. As shown, the total resistance of the circuit 401 includes $R_{ELG}$ in series with the two parallel resistances $R_{S1}$ and $R_{S2}$. The total resistance ($R_{TOT}$) can be expressed as:

$$R_{TOT} = R_{ELG} + 1/(1/R_{S1} + 1/R_{S2}) \quad (1)$$

Figure 5:
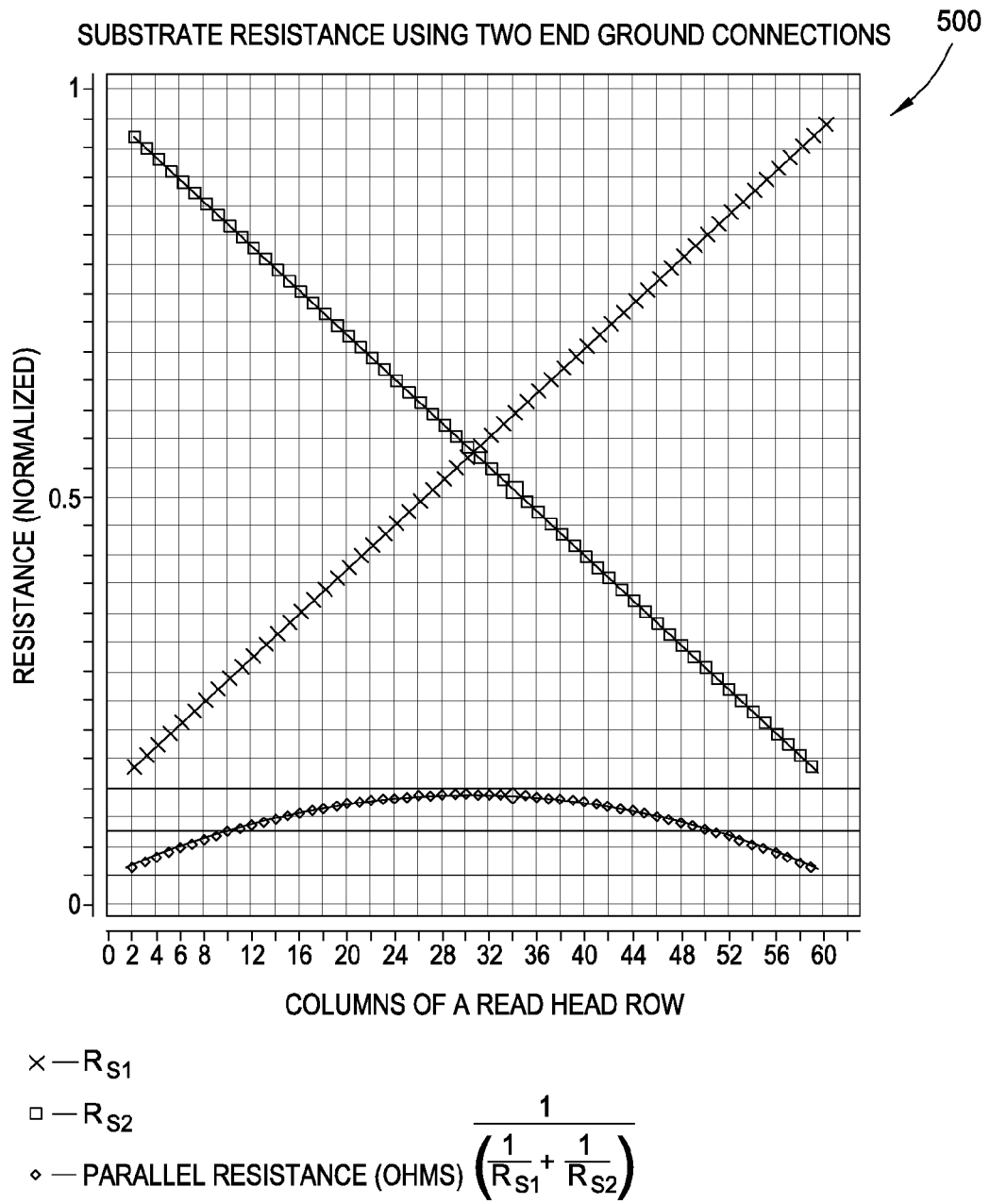
FIG. 5 is a chart illustrating resistances of an electrical circuit where the substrate is used as a ground plane, according to one embodiment described herein.

FIG. 5 is a chart 500 illustrating resistances of an electrical circuit where the substrate is used as a ground plane, according to one embodiment described herein. Specifically, the chart 500 illustrates the resistance of the substrate configured as shown in FIG. 4A where the lapping controller is coupled to two ground connections at the ends of a row containing a plurality of read heads. Specifically, the row includes 60 read heads that are each assigned to a column. Chart 500 records the substrate resistance in three scenarios: (1) using only the leftmost ground connection, (2) using only the rightmost ground connection, and (3) using both ground connections. If the lapping controller was coupled to only the leftmost ground connection, the resistance of the substrate is shown by $R_{S1}$. As the lapping controller tests read heads in columns further away from the leftmost ground connection, the value of $R_{S1}$ increases. The reverse is true when the lapping controller is coupled only to the rightmost ground connection as shown by $R_{S2}$. However, if the lapping controller is coupled to both ground connections and because $R_{S1}$ and $R_{S2}$ are in parallel, the maximum resistance of the substrate is less than the minimum resistance if only $R_{S1}$ or $R_{S1}$ is used. As such, the substrate resistance may be reduced further if another ground connection is added in parallel—e.g., connecting the negative side of the voltage source 405 to a grounding pad of a read head in the middle of the row.

Figure 6:
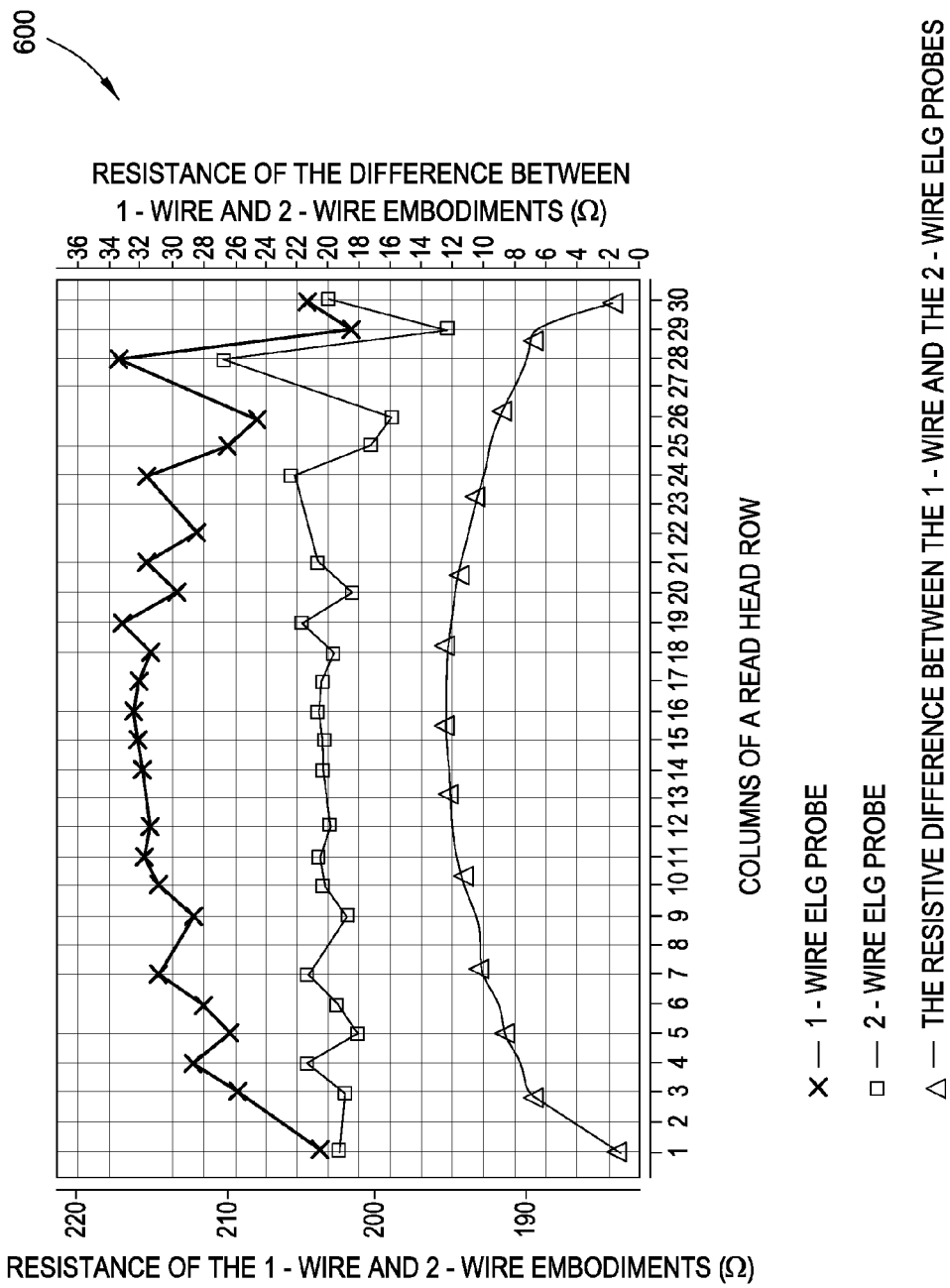
FIG. 6 is a chart comparing resistances between an electrical circuit that uses the substrate as a common ground and an electrical circuit that does not, according to one embodiment described herein.

FIG. 6 is a chart 600 comparing resistances between an electrical circuit that uses the substrate as a common ground and an electrical circuit that does not, according to one embodiment described herein. The chart 600 records the total resistances $R_{TOT}$ of two different embodiments. In the 2-wire ELG probe embodiment, the ELG is connected to the lapping controller using two wires: one wire is coupled to the bonding pad while the other wire is coupled to a grounding pad. Using read head 205 shown in FIG. 2A as an example, one wire is coupled to the grounding pad 250 while the other is attached to the bonding pad 220. Thus, the current flows through the substrate in a very small portion. In contrast, the 1-wire ELG probe embodiment may use a larger portion of the substrate 210 as part of the current path that passes a current through the ELG than the 2-wire embodiment. As mentioned above, the lapping controller may use a ground connection located separately from the read head that is currently being tested. Specifically, the 1-wire ELG probe includes two ground connections, one at each end of the row. As a result of the using at least a portion of the substrate for the current path, the 1-wire ELG probe embodiment, in general, has a higher total resistance than the 2-wire embodiment. Note that the resistances shown on the rightmost Y axis may change depending on the configuration of the testing system, such as the design of the read head, the testing method used, the ELG material, and the like.

The chart 600 is overlayed to include the difference between the 1-wire and 2-wire embodiments (the bottommost graph). This graph illustrates that the resistance difference between the two embodiments increases as the ELGs located in the middle of the row of read heads are tested. Because these ELGs are located the furthest from the two ground connections at the end of the row, the current travels the most distance in the substrate, thereby increasing the total resistance. If the graphs of the 1-wire and 2-wire embodiments are normalized, the ELG resistance values of the 2-wire embodiment remain substantially the same across the different columns while the ELG resistance values of the 1-wire embodiment increases towards the middle of the columns. The difference graph illustrates this error resulting from sharing a common ground connection.

In one embodiment, this error may be minimized by placing more ground connections in parallel. As shown in FIG. 5, the error caused by the substrate resistance is reduced each time a ground connection is added in parallel. Thus, adding a third ground connection in the middle of the row may reduce the error to acceptable limits. That is, the lapping controller may use the same predefined relationship between the measured resistance and the stripe height used in the 2-wire ELG probe embodiment when using the 1-wire ELG probe embodiment. In addition, the number of wire bonds needed to connect the lapping controller is also reduced relative to the 2-wire ELG probe schema which may result in substantial cost savings.

Figure 7:
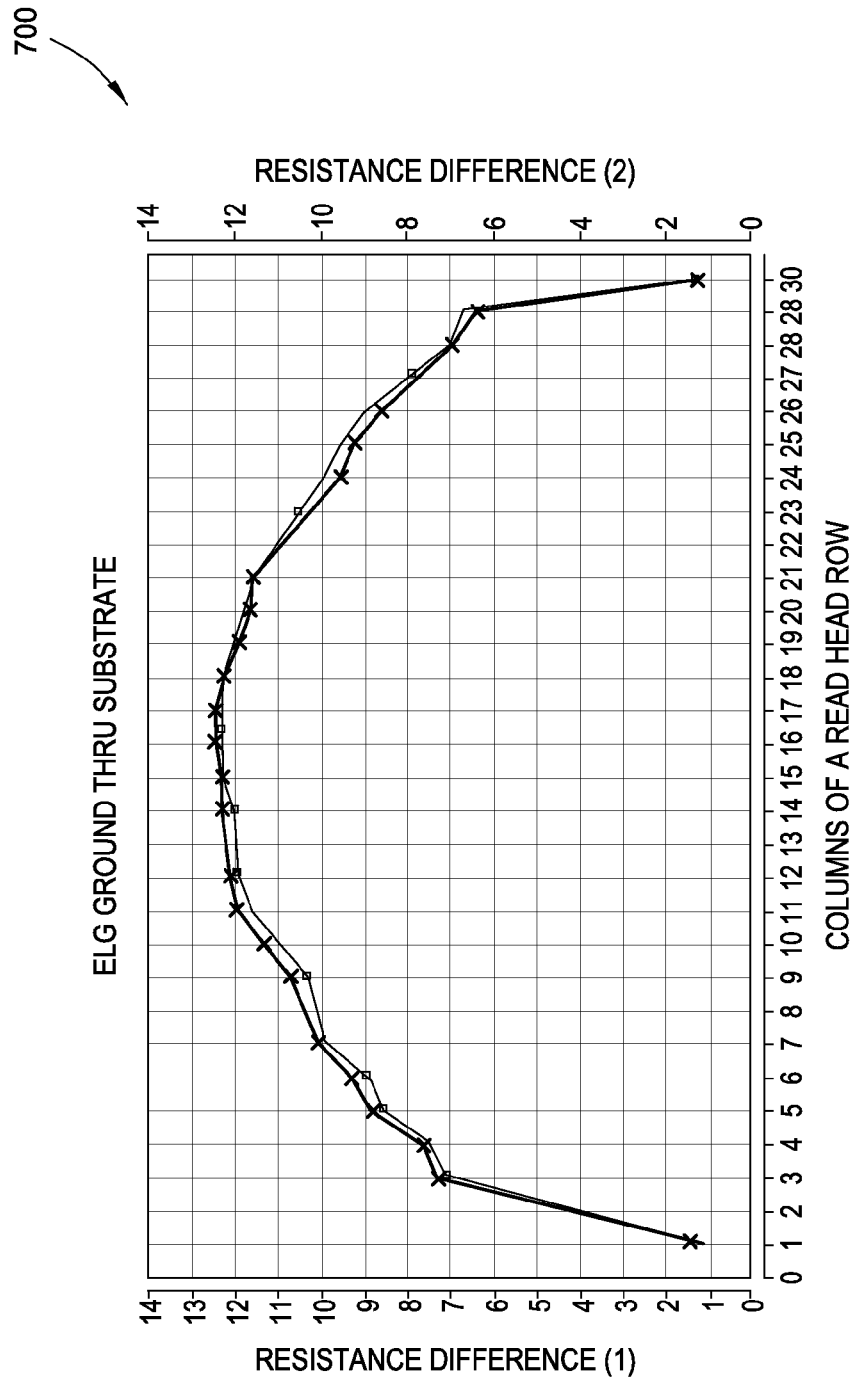
FIG. 7 is a chart where the added resistances associated with using the substrate as the common ground are compensated for, according to one embodiment described herein.

In another embodiment, the error may be accounted for and mitigated by subtracting from the $R_{TOT}$—i.e., the resistance measured by the lapping controller—the contribution of the substrate's resistances (e.g., $R_{S1}$ and $R_{S2}$). FIG. 7 is a chart 700 where the added resistances associated with using the substrate as the common ground are compensated for, according to one embodiment described herein. Specifically, the chart 700 shows two difference graphs for two different rows of read heads. If the difference graphs—i.e., the difference between the 1-wire and 2-wire embodiments for a particular row—remain the same regardless of the particular row of a wafer, then these graphs may be used as an offset when the resistance module in the lapping control derives the value of $R_{ELG}$. When the lapping controller measures a total resistance at a particular column, the difference graph may be used to subtract the substrate resistance from the measured resistance, thereby yielding $R_{ELG}$. For example, if the lapping controller measures 1000Ω when coupled to the read head at column 12, based on chart 700, the controller would subtract 12Ω from this measured resistance. In this manner, the lapping controller translates a resistance measured using a 1-wire embodiment into a resistance that would have been measured if the 2-wire embodiment were used. Thus, the same predefined correlation between the measured resistance of the ELG and the stripe height used in the 2-wire embodiment may be used in the 1-wire embodiment. However, instead of requiring two wire bonds for every read head being monitored, the 1-wire embodiment uses only one wire bond per read head in addition to one or more common ground connections, again resulting in cost savings.

Figure 8:
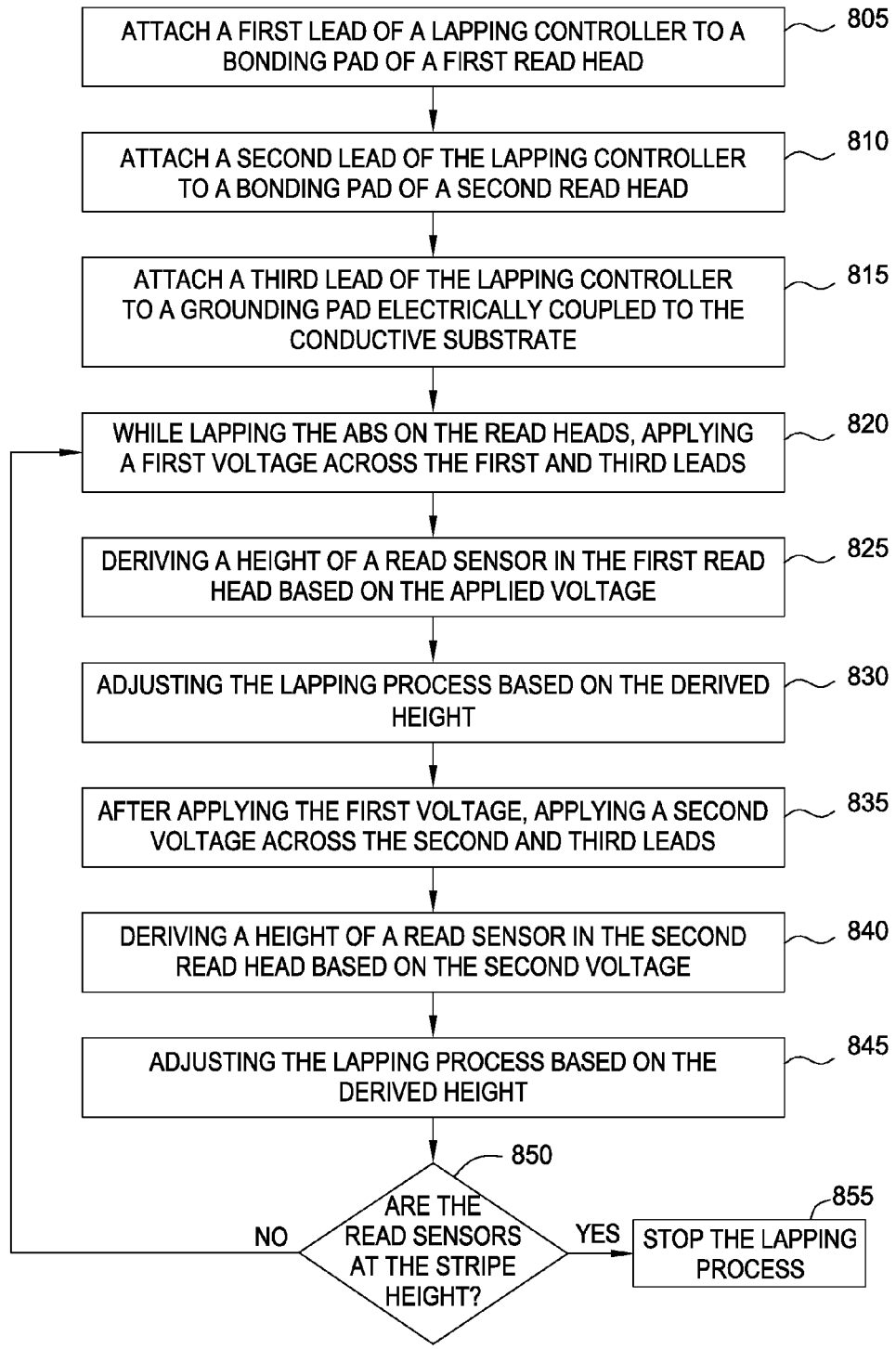
FIG. 8 illustrates a method of using the substrate to measure a resistance of an ELG, according to one embodiment described herein.

FIG. 8 illustrates a method 800 of using the substrate to measure a resistance of an ELG, according to one embodiment described herein. The method begins at step 805 where a first lead or wire of a lapping controller is bonded to a pad of a first read head. Specifically, the pad is electrically coupled to an ELG inside of the first read head. In one embodiment, the lead is attached by wire bonding a conductive wire to the pad. Alternatively, the lapping controller may be coupled using a soldering technique, conductive paste, ultrasonic bonding, and the like. Moreover, attaching the lead to the pad may be performed by either a technician or by a wire bonding apparatus.

At step 810, a second lead of the lapping controller is attached to a bonding pad on a second, different read head electrically coupled to another ELG. Both the ELG in the first read head as well as the ELG in the second read head may be electrically connected to a shared substrate that is a common ground for the ELGs. At step 815 a third lead of the lapping controller is attached to a bond pad that is electrically coupled to the shared substrate on which the first and second read heads are disposed. As mentioned above, this bonding pad may be located on either the first or second read heads, a different read head on the substrate, or even the substrate itself. Moreover, the present embodiments are not limited to using a bonding pad for providing the connection to the substrate but may use any suitable electrical connection technique.

At step 820, the lapping controller applies a voltage across (or injects a current into) the first lead coupled to the first read head and the third lead coupled to the substrate. This voltage causes a current to flow through the ELG and the substrate. In one embodiment, the voltage is applied when the ABS on the reads heads is currently being lapped. For example, a multiplexer in the lapping controller sequentially scans through all the different connected reads at a predefined interval—e.g., 50 msec per read head. If additional lapping controllers or testing equipment is added, the different channels (i.e., different current paths) may be tested in parallel. However, in other embodiments, the lapping process may be paused while the lapping controller measures the current resulting from the applied voltage.

At step 820, the lapping controller derives the resistance of the ELG based on the total resistance determined by measuring the current. In one embodiment, the resistance of the substrate may be small compared to the resistance of the ELG (i.e., the substrate resistances are in parallel as shown in FIG. 4B). Accordingly, the lapping controller may assume that the total measured resistance is the same as the resistance of the ELG. Alternatively, the lapping controller adjusts the total resistance based on an offset value that is the difference between embodiments where the current passes through the substrate and where the current passes through two bonding pads on the read head as discussed with regards to FIGS. 6-7. Once the resistance of the ELG is derived, at step 825, the lapping controller correlates this resistance to a height of the read sensor. Because the substrate includes a plurality of read heads, the lapping controller may adjust the pressure used to lap the first read head if its ABS is being lapped differently from other read heads on the substrate. For example, at step 830, the lapping controller may apply greater pressure to the portion of the substrate that includes the first read head so that the rate at which the height of the ELG and the read sensor are lapped increases.

At step 835, the lapping controller may switch from applying a voltage to the first lead to applying a voltage on the second lead attached to the second read head. Notably, even when switching between different read heads, the lapping controller continues to use the same ground connection (i.e., the third lead) to induce a current in the respective ELG. Moreover, the voltage may be applied to both the first and second read heads in the same lapping process—i.e., without pausing the lapping process. At step 840, the lapping controller may use the same techniques discussed in step 825 to derive a height of the read sensor in the second read head based on the measured resistance of the ELG in the second read head. However, these techniques may be modified based on the location of the second read head on the substrate. For example, if the second read head is located at a different column on the substrate, the offset applied to adjust for the substrate resistance may be different than the offset used to determine the $R_{ELG}$ for the first read head. At step 845, the lapping controller may update the lapping process based on the derived height of the read sensor.

At step 850, the lapping controller determines if the read sensors are at the desired stripe height (e.g., approximately 40 nm). If not, the lapping controller may return to step 820 to again adjust the lapping process based on the resistances of the ELGs. In one embodiment, the lapping controller continually (or at predefined intervals) sweeps through the read heads coupled to the controller to adjust the pressure applied to the substrate by a lapping system. Constantly adjusting the lapping process may account for any inconsistency in the fabrication process and ensure that the read sensors in the plurality of read heads on the substrate reach the desired stripe height at substantially the same time. Once the lapping controller determines the read sensors are at the desired height, at step 855, the lapping process ends.

Conclusion

Embodiments described herein generally relate to connecting an ELG to a lapping controller such that the number of wire bonds from the controller to the read head is minimized. When lapping the ABS of a read head (or a plurality of read heads), the electrical resistance of the ELG is used to adjust the lapping process and set the stripe height for a read sensor in the read head. Specifically, as an exterior surface of the ELG at the ABS is lapped, the resistance of the ELG increases. Once the resistance corresponds to the desired stripe height—i.e., the distance between the ABS and the back edge of the read sensor—the lapping process is stopped. To measure the electrical resistance of the ELG, a lapping controller is wire bonded to at least one pad on the read head that electrically connects the controller to the ELG. In addition to being connected to the pad, the ELG is electrically connected to an electrically conductive substrate on which the read head is disposed. The substrate may be used as a common ground for the current that flows through the bond pad and the ELG.

Because many read head fabrication techniques lap a plurality of read heads simultaneously, each ELG in the read heads may be electrically coupled to the substrate—i.e., share the same ground plane. The lapping controller is then wire bonded to the individual ELGs via respective pads, but the controller is connected to the substrate only at a few locations. For example, the lapping controller may be wire bonded to four ELGs in a row of read heads but only have one or two electrical connections to the conductive substrate. The resistances of each of the connected ELGs can be monitored by sweeping through the different wire bond connections. In contrast, if a shared common ground is not used (i.e., current does not flow through the substrate) the lapping controller couples to two pads per read head in order to measure the resistance of the ELG. When using a shared ground connection to the substrate, however, the lapping controller may be connected to only one bond pad for each ELG of interest. Minimizing the number of wire bonds by using a common ground (e.g., the conductive substrate) may provide cost savings compared to wire bonding the lapping controller to two bonding pads per read head. For example, minimizing the number of wire bonds may reduce the amount of gold wire used, reduce product defects caused by gold contamination from wire bonding, cracks near pad areas, pad defects, labor cost, and the like.

While the foregoing is directed to embodiments of the present invention, other and further embodiments of the invention may be devised without departing from the basic scope thereof, and the scope thereof is determined by the claims that follow.

What is claimed is:

1. A device, comprising:
    a substrate; and
    a plurality of read heads disposed on the substrate, a first one of the plurality of read heads comprising:
        a read sensor configured to detect magnetic orientation changes in a magnetic media,
        an electronic lapping guide (ELG) configured to indicate, based on a resistance of the ELG, a stripe height of the read sensor, wherein the ELG is electrically coupled to the substrate, and
        a first bonding pad electrically coupled to the ELG, wherein the first bonding pad, the ELG, and the substrate are part of a current path permitting current to flow through the ELG, wherein each ELG of the plurality of read heads is coupled to two ground pads that are to be separately coupled to a lapping controller.

2. The device of claim 1, further comprising a second bonding pad electrically coupled to the substrate and part of the current path permitting current to flow through the ELG.

3. The device of claim 2, wherein the second bonding pad is disposed on a second read head of the plurality of read heads that is different from the first read head comprising the ELG.

4. The device of claim 2, wherein the second bonding pad is disposed on a portion of the substrate that does not include one of the plurality of read heads.

5. The device of claim 1, wherein the plurality of read heads is arranged in a row on the substrate.

6. The device of claim 1, wherein the substrate is one of: alumina and titanium carbide.

7. The device of claim 1, wherein the ELG is not electrically connected to a second bonding pad in the first read head.

8. The device of claim 1, wherein the read sensor is one of a tunneling magnetoresistance sensor and a giant magnetoresistance sensor.

9. A system, comprising:
    a substrate comprising a plurality of read heads, each read head comprising:
        a read sensor configured to sense data stored in a magnetic media,
        an ELG configured to indicate, based on a resistance of the ELG, a stripe height of the read sensor, wherein the ELG is electrically coupled to the substrate, and
        a bonding pad electrically coupled to the ELG, wherein the bonding pad, the ELG, and the substrate are part of a current path permitting current to flow through the ELG,
    a lapping unit configured to simultaneously lap an air bearing surface on the plurality of read heads, wherein the substrate is mounted on the lapping unit; and
    a lapping controller electrically coupled to the bonding pad and the substrate, the lapping controller configured to measure the resistance of the ELG using the current path and transmit instructions to the lapping unit based on the measured resistance, wherein each ELG of the plurality of read heads is coupled to two ground pads that are separately coupled to the lapping controller.

10. The system of claim 9, further comprising a substrate access pad electrically coupled to the substrate, wherein the lapping controller is electrically coupled to the substrate via the substrate access pad.

11. The system of claim 10, wherein the lapping controller is electrically coupled to a first bonding pad in a first one of the plurality of read heads and a second bonding pad on a second one of the plurality of read heads, wherein the lapping controller uses a first current path from the first bonding pad to the substrate access pad to measure a resistance of a first ELG in the first read head and a second current path from the second bonding pad to the substrate access pad to measure a resistance of a second ELG in the second read head.

12. The system of claim 10, wherein the substrate access pad is disposed on one of the plurality of read heads.

13. The system of claim 9, wherein the lapping controller is physically coupled to at most one bonding pad in a first one of the plurality of read heads when measuring the resistance of an ELG in the first read head.

14. A method, comprising:
    attaching a first wire to a bonding pad on a first one of a plurality of read heads disposed on a substrate, the first read head comprising:
        a read sensor configured to detect magnetic orientation changes in a magnetic media, and
        an ELG configured to indicate, based on a resistance of the ELG, a stripe height of the read sensor, wherein the ELG is electrically coupled to the substrate, and wherein the bonding pad is electrically coupled to the ELG, wherein each ELG of the plurality of read heads is coupled to two ground pads that are separately coupled to a lapping controller;
    attaching a second wire to a substrate access pad electrically coupled to the substrate; and
    applying a voltage potential across the first and second wires such that current flows through the substrate and the ELG.

15. The method of a claim 14, further comprising:
    attaching a third wire to a second bonding pad on a second one of the plurality of read heads; and
    applying a voltage potential across the second and third wires such that current flows through the substrate and an ELG in the second read head.

16. The method of claim 15, further comprising, during a same lapping period, switching between applying the voltage potential across the first and second wires to applying the voltage potential across the second and third wires.

17. The method of claim 14, wherein the substrate access pad is not disposed on the first read head.

18. The method of claim 14, wherein the voltage potential across the first and second wires is applied while lapping an air bearing surface on the plurality of read heads.

19. The method of claim 14, further comprising, while applying a voltage potential across the first and second wires:
    measuring a resistance of the ELG based on the current flow; and
    correlating the measured resistance to the stripe height of the read sensor.

20. The method of claim 19, further comprising, upon determining the stripe height of the read is at a predetermined value, instructing a device to cease lapping an air bearing surface of the first read head.

* * * * *